UNITED STATES PATENT OFFICE.

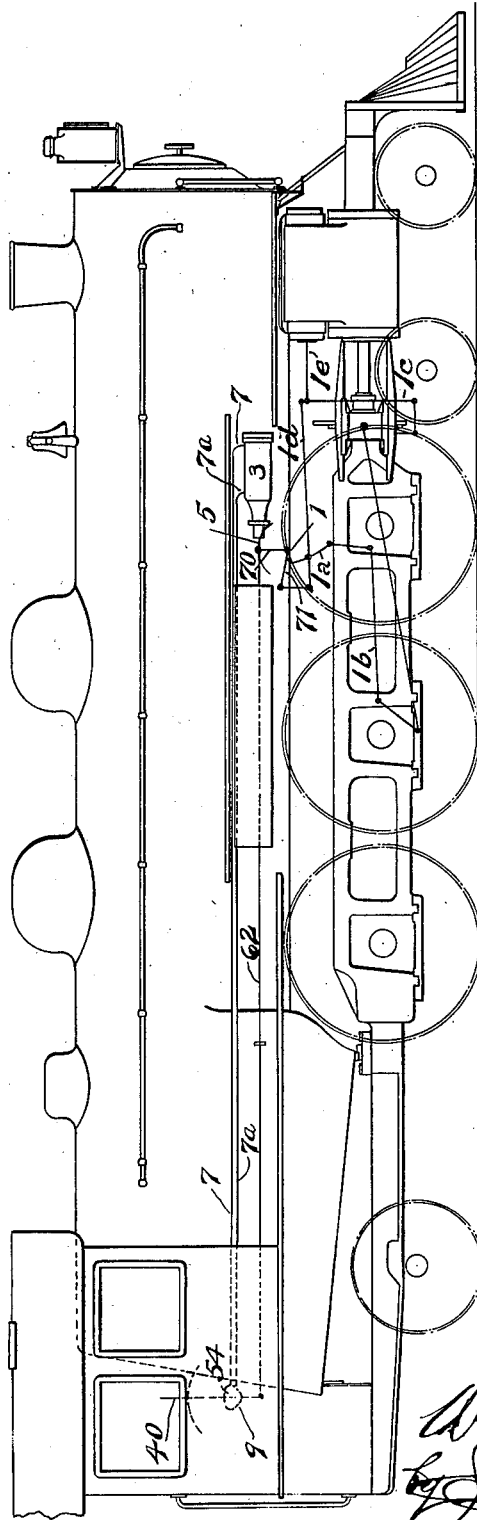

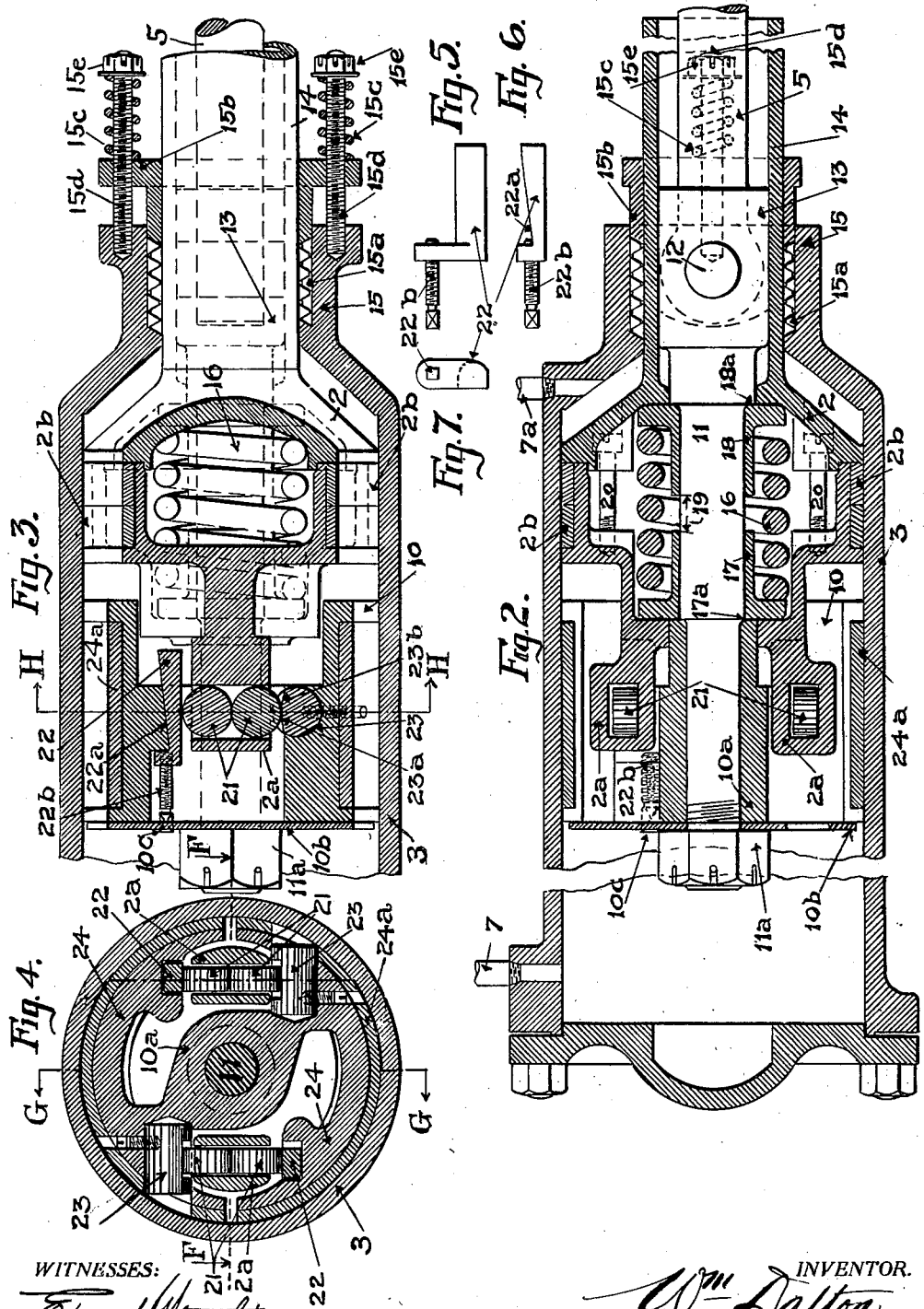

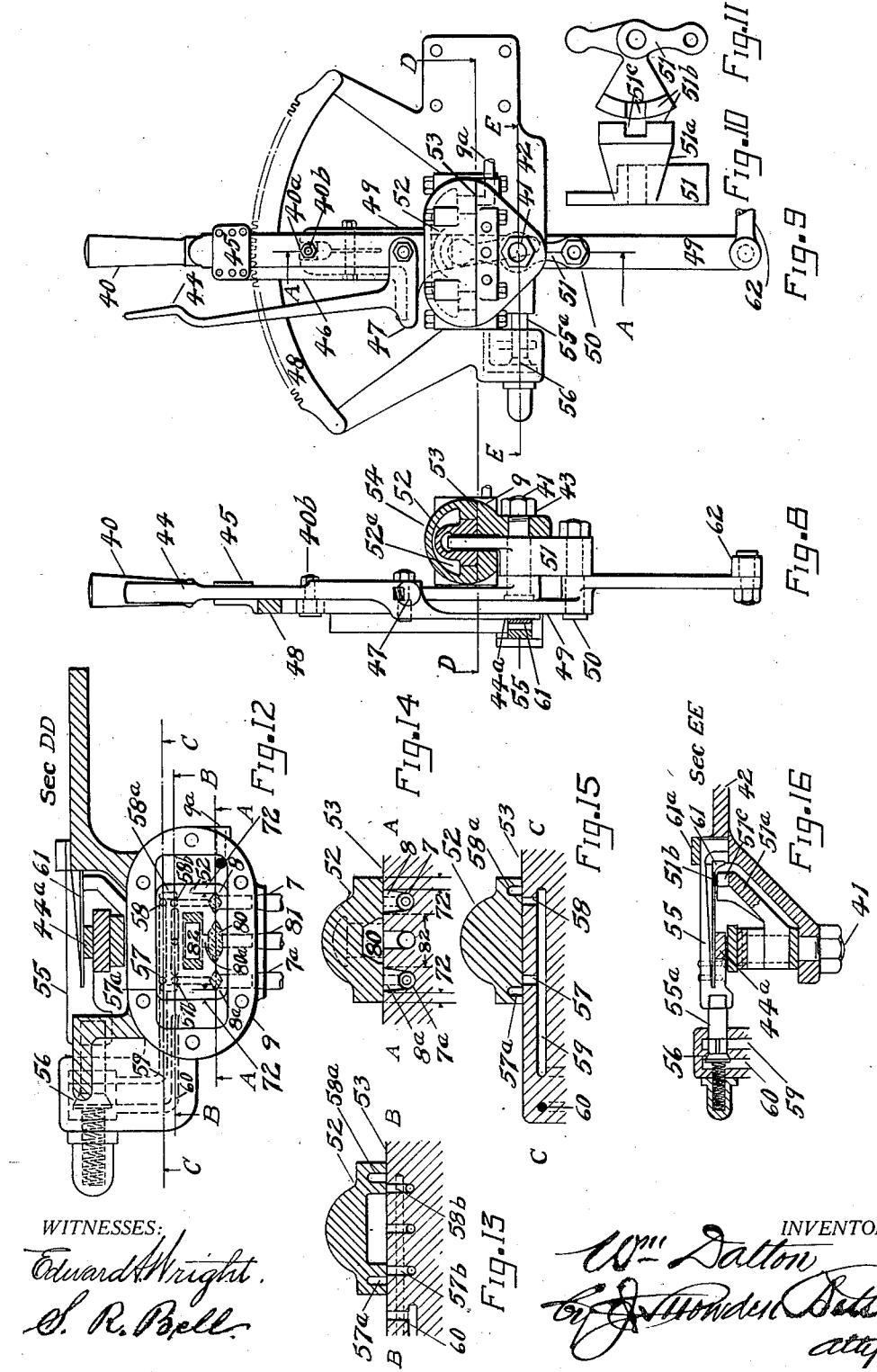

WILLIAM DALTON, OF SCHENECTADY, NEW YORK

STEAM-ENGINE VALVE-REVERSING GEAR.

1,073,403.

Specification of Letters Patent.  Patented Sept. 16, 1913.

Application filed July 1, 1913. Serial No. 776,800.

*To all whom it may concern:*

Be it known that I, WILLIAM DALTON, of Schenectady, in the county of Schenectady and State of New York, have invented a certain new and useful Improvement in Steam-Engine Valve-Reversing Gear, of which improvement the following is a specification.

My invention relates to power actuated reversing gear for steam engine valve mechanisms, and more particularly those of locomotives, and, generally stated, its object is to provide a simple and efficient reversing gear, of ready applicability to engines of existing constructions, and particular adaptability to use on switching locomotives, in the operation of which it is necessary to promptly and repeatedly make reversals of the direction of movement by an efficient and reliable mechanism.

A further object is to provide effective means for locking the reverse gear in positions corresponding to selected valve adjustments, and means whereby the locking device shall be gradually released by a movement of the actuating piston, independently of, and prior to, the movement of the reversing mechanism and valve gear.

A further object of the invention is to provide means whereby the controlling motive fluid valve shall be placed on "lap", that is to say, with the governing ports completely closed, for any selected adjustment of the reversing gear, and means for preventing derangements in the adjustments of the controlling valve due to slight movements of long reach rods, by the expansion and contraction of the locomotive frame, boiler, and members upon which the reversing gear may be mounted, as well as to avoid the destructive ramming action of long and heavy reach rods heretofore used when the reversing gear locking mechanism is located in the cab of the locomotive.

The improvement claimed is hereinafter fully set forth.

In the accompanying drawings: Figure 1 is a side view, in elevation, of a locomotive engine, illustrating diagrammatically, the application of my invention in connection with a Walschaert valve gear; Fig. 2, a longitudinal central section through the reversing cylinder and pneumatic clutch, on the line F F of Fig. 4; Fig. 3, a partial similar section, on the line G G of Fig. 4; Fig. 4, a transverse section, on the line H H of Fig. 3; Figs. 5, 6, and 7, detail views of the means for adjusting the clutch; Fig. 8, an end view, partly in section, on the line A A of Fig. 9, of the controlling valve and manually operable reverse lever; Fig. 9, a side view, in elevation, of the same; Figs. 10 and 11, detail views of the controlling valve lever and means for closing the pilot valve; Fig. 12, a plan view, partly in section on the line D D of Fig. 9, of the controlling valve casing, with its cover removed; Fig. 13, a vertical longitudinal section through the controlling valve and its ports, on the line B B of Fig. 12; Fig. 14, a similar section, on the line A A of Fig. 12; Fig. 15, a similar section, on the line C C of Fig. 12; and Fig. 16, a horizontal section, showing the pilot valve and its actuating mechanism, on the line E E of Fig. 9.

Referring to the drawings, my invention, which is applicable in connection with any of the various known types of distribution valve actuating mechanisms, is diagrammatically illustrated in Fig. 1, as applied for the control of a Walschaert valve gear of the ordinary construction, which comprises a link, 1$^a$, eccentric rod, 1$^b$, combination lever, 1$^c$, and radius bar, 1$^d$, and is coupled to a distribution valve stem, 1$^e$. The radius bar is coupled to the lower arm, 71, of a reverse shaft, 1, and is raised and lowered throughout its range of traverse on the link, 1$^a$, by my improved reversing mechanism, hereinafter described, which is coupled to the upper arm, 70, of the reverse shaft.

In the practice of my invention, I provide a fluid pressure reversing cylinder, 3, which is located as nearly as practicable to the valve gear, and therefore at a substantial distance from the cab of the locomotive, on which a reverse lever, 40, and a casing, 9, 54, inclosing a controlling valve, 52, are suitably mounted. The controlling valve casing communicates, by fluid conduits, 7, 7$^a$, with opposite ends of the reversing cylinder, 3, and the controlling valve, 52, is coupled, through intermediate connections, to a reach rod, 62, which, in turn, is coupled to the upper arm, 70, of the reverse shaft. The reversing cylinder is fitted with a hollow or chambered piston, 2, which is provided with suitable packing rings, 2$^b$, and is fitted, with a limited degree of longitudinal movement, on a rod or stem, 11, which is pivotally connected, by a pin, 12, to a rod, 5, the opposite end of which is coupled to the reverse arm, 70.

An expansible cylindrical friction brake or pneumatic clutch, which, as a whole, is indicated by the numeral, 10, is fitted in the reversing cylinder, 3, adjacent to the piston, 2, said clutch being in the form of two longitudinally separated peripheral friction members, 24, the outer faces of which are semi-cylindrical and curved in correspondence with the bore of the reversing cylinder, 3, and which are connected to a central hub, $10^a$. The clutch is secured on the piston rod, 11, between a shoulder on said rod, within the piston, and a nut, $11^a$, engaging the rod and bearing on the opposite end of the hub, $10^a$, of the clutch. The piston, 2, is adapted to move longitudinally on the rod, 11, for a distance equal to the space, marked 19 on Fig. 3, between the ends of two tubular spring seats, 17, 18, which are fitted freely on the rod, and normally abut against the end face, $17^a$, of the hub, $10^a$, of the pneumatic clutch and against a shoulder, $18^a$, on the rod, respectively. A helical spring, 16, is interposed between, and bears at its ends on, the spring seats, 17, 18, and initial compression, which is imparted to the spring by the nut, $11^a$, in assembling the piston and pneumatic clutch, holds the piston in its mid or central position, with the spring seats against their respective stops, $17^a$, $18^a$, as shown in Figs. 2 and 3.

The hollow piston, 2, is made air tight, and is provided with a tubular cylindrical extension or trunk, 14, which projects outwardly from the cylinder, through a stuffing box, 15, on the rear end thereof, and surrounds the connecting rod, 5, its bore being sufficient to permit the necessary angular movement of said rod. A tight joint is insured by packing rings, $15^a$, located in the stuffing box, which is compressed by a gland, $15^b$, and nuts, $15^e$, engaging stud bolts, $15^d$, fixed in the end of the cylinder. In order to produce a yielding pressure and effect an automatic adjustment for wear of the packing rings, springs, $15^c$, are interposed between the nuts, $15^e$, and the gland.

The piston, 2, is formed in two sections, secured together by tap bolts, 20, in order to admit of the ready insertion and removal of the packing rings, $2^b$, the spring, 16, and the spring seats, 17, 18, and roller supports, $2^a$, are formed on the section adjoining the friction clutch, said supports projecting into passages in the clutch between the semi-cylindrical faced expansible members, 24, thereof, and a pair of rollers, 21, is journaled in each of said supports. Hardened steel adjusting wedges, 22, each having an inclined face, $22^a$, and an adjusting screw, $22^b$, are inserted between the ends of the friction members adjoining the supports, $2^a$, and a hardened steel bearing, 23, is screwed to each friction member, adjoining the opposite ends of said supports. The adjusting screws, $22^b$, are, after adjustment, locked by a disk, $10^b$, secured to the clutch by the nut, $11^a$, being held by the engagement of squared heads on their ends with corresponding openings in the disk. Oppositely inclined faces, $23^a$, $23^b$, are formed on the fixed bearings, 23, said faces being commonly tangential to the peripheries of the rollers, 21, when the piston is in its middle or normal position, as indicated in Fig. 3. In this position, the adjusting screws, $22^b$, are sufficiently tight to lock or prevent motion of the clutch and valve gear under normal operative conditions.

In the operation of the reversing mechanism for any desired change in the adjustment of the valve gear, which would require a movement of the piston and clutch toward the left, motive fluid, as compressed air, is slowly admitted to the right hand end of the cylinder through the conduit, $7^a$, from a controlling valve hereinafter described, exhaust from the opposite end of the cylinder, through the conduit, 7, being simultaneously opened. The slowly admitted motive fluid gradually increases the pressure on the right hand side of the piston, 2, and moves it slowly to the left, against the resistance of the spring, 16. This action causes the rollers, 21, to move down the inclines, $23^a$, whereby the friction members of the clutch are gradually released, and their resistance to the movement of the piston decreased, until the motive fluid pressure becomes sufficient to overcome it and move the piston for the distance required to actuate the reversing gear throughout the desired range of movement. By a slight reduction of motive fluid pressure, effected by the movement of the controlling valve, a corresponding reaction of the spring is caused to be exerted, and the rollers are returned to the middle or locking position, thereby again locking the piston and clutch against movement. To effect any desired movement to the right, motive fluid is admitted to the reversing cylinder through the left hand conduit, 7, and, passing through the clutch, exerts pressure on the left hand side of the piston, thereby compressing the spring, 16, and causing the rollers, 21, to move down the inclined faces, $23^b$, thereby gradually releasing the clutch and permitting the piston to be moved to the right by the pressure of the motive fluid. The friction of the piston extension in the stuffing box, prevents the piston from fluttering or chattering in operation. In order to prevent abrasion of the wearing surfaces, a brass, or fibrous, ring, $24^a$, is fitted in the periphery of the clutch.

The manually operable reverse lever and controlling valve, by which the admission and exhaust of motive fluid to and from either side of the piston, 2, are effected and controlled, are shown in Figs. 8 to 16 inclusive. A hand reverse lever, 40, is pivoted to swing in a vertical plane on a fixed pin, 41, which is secured to the base, 9, of a controlling valve casing located in the cab of the locomotive, by a nut, 43. A latch lever, 44, having a handle on its upper end, is pivoted on the lever, 40, and coupled to a latch, 45, sliding on said lever, by a latch bar, 46, the lower end of which is bent at a right angle and secured to the latch lever. The latch is moved into and out of engagement with the teeth of a fixed segment, 48, by movements of the latch lever from and toward the reverse lever, as from time to time desired. A floating lever, 49, is fulcrumed on a pin, 50, which is secured to the lower end of a controlling valve lever, 51, fulcrumed on the pin, 41, of the reverse lever, said controlling valve lever projecting upwardly into the casing 9, 54, of a controlling valve, 52. The lever, 51, passes through the seat, 53, of the valve, 52, which is formed on the base, 9, of the valve casing, and engages the valve at its upper end. The space within the casing constitutes a valve chamber, $52^c$, which is in communication with a reservoir of compressed air, or other source of fluid pressure, through an inlet, $9^a$. The upper end of the floating lever, 49, engages a block, $40^a$, which is pivotally connected to the reverse lever, by a pin, $40^b$, at a point approximately midway between the handle of the lever and the fixed pin, 41. The reach rod, 62, is coupled to the lower end of the lever, 49, and extends outwardly therefrom to its pivotal connection with the upper arm, 70, of the reverse shaft. Inasmuch as the lower arm of the floating lever, 49, can be made of considerable length, the longitudinal movement of the reach rod is very large, as compared with that of the valve, and therefore the usual small errors due to lost motion, expansion and contraction of the members of the locomotive between the valve and the reverse shaft, or slight shop errors, do not appreciably affect the accuracy of the valve movements or the refinement of adjustment. Further, such comparatively large movement of the reach rod, in the actuation of the small controlling valve, admits of the use of a very light reach rod, thereby eliminating the seriously objectionable and destructive ramming action of the heavy reach rods heretofore interposed between a vibrating locomotive valve reverse gear and locking devices generally located in the cab, at a great distance from the reverse gear. This ramming action rapidly deteriorates locking devices located in the cab, the deterioration being accelerated as the bearings become worn, and is frequently the cause of accident by loosening the locking device or segment latch of a worn reverse gear.

Ports, 8 and $8^a$, in the seat of the controlling valve, communicate, respectively, with the opposite ends of the reversing cylinder, 3, through the conduits, 7 and $7^a$. In order to adjust the reverse gear from middle to any forward position, the latch, 45, is released from the segment, 48, by movement of the latch lever, 44, and the reverse lever, 40, is moved forward, or toward the right, to the desired position. This movement of the reverse lever imparts a corresponding angular movement to the floating lever, 49, about its lower pivotal connection with the reach rod, thereby moving the pin, 50, and the lower end of the valve lever, 51, toward the right, and moving the valve, 52, to the left. This movement of the valve opens the admission port, 8, and admits motive fluid, through the conduit, 7, to the reversing cylinder, causing the upper reverse shaft arm, 70, to move rearwardly, and the lower arm, 71, downwardly, into the forward position, corresponding, approximately, with that of the reverse lever, 40. The reach rod, 62, will, meanwhile, have moved toward the left until the valve lever, 51, has very nearly returned to its vertical closed or normal position. The valve, 52, has, as shown in Figs. 12 and 14, considerable lap on its admission ends, and therefore the rearward movement of the reach rod, 62, will close the admission port, 8, before the valve, 52, and valve lever, 51, return to their exact central or normal positions, and therefore would stop the movement of the piston, 3, before the reverse shaft assumes the precise position corresponding to the position of the reverse lever, 40. Further, when the valve, 52, has sufficiently closed the port to materially lessen the flow of motive fluid to the reversing cylinder, a leakage, from wear in the cylinder, would cause the pressure to drop sufficiently to stop the movement before the port was fully closed, and thereby would, in middle position, cause a waste of motive fluid, which would blow through the nearly closed port and leaky cylinder. To prevent such objectionable results, and to cause the main admission ports, 8 and $8^a$, to be fully covered by the valve laps, 72, creeping ports, 57 and 58, controlled by a pilot valve, are provided and operated as hereinafter described.

A pilot valve, 56, controls communication between a passage, 60, leading from the valve chamber, $52^a$, and a passage, 59, located below the seat, 53, of the controlling valve, 52, from which passage, creeping ports, 57, 58, lead to the seat face, and recesses, $57^a$, $58^a$, adapted, respectively, to communicate with said creeping ports, are formed in the face of the valve, 52. The lower end, $44^a$, of the latch lever, 44, engages a sliding bar, 55, connected to the stem, 55ª, of the pilot valve, and when the latch lever is moved toward the reverse lever, its lower end, 44ª, will unseat the pilot valve and admit fluid under pressure from the valve chamber, 52ª, to the creeping ports, 57, 58. A spring valve stem trigger, 61, is secured to the bar, 55, and when the latch lever unseats the pilot valve, the trigger, 61, springs over the notched rim, 51ᵇ, of a segmental projection, 51ª, formed on the valve lever, 51. When the latch lever, 44, is released, to permit the latch, 45, to engage with the fixed segment, 48, the lower end of the latch lever is withdrawn from contact with the bar, 55, and would permit the closure of the pilot valve, but such closure is prevented by the trigger, 61, having abutted against the inner face of the rim, 51ᵇ, thereby holding the pilot valve unseated, to admit fluid pressure to the reversing cylinder through either of the valve cavities, 57ª or 58ª, and its communication with the main port, 8ª, and conduit, 7ª, by the port, 57ᵇ, or the main port, 8, and conduit, 7, through the port, 58ᵇ. For example, when the reverse lever is slightly moved forward, to the right, by lifting the latch, 45, and thereby opening the pilot valve, and by reason of the fact that there are no appreciable laps governing the small creeping ports, 57, 57ᵇ, and 58, 58ᵇ, the pilot valve will instantly admit motive fluid through the creeping ports, 58, 58ᵇ, and the conduit, 7, to the corresponding end of the reversing cylinder, 3, and impart slow movement to the piston, 2. When the reverse lever, 40, is moved for a considerable distance, and thereby causes a greater movement of the valve lever, 51, the main port, 8, will be uncovered by the lap, 72, and more rapid movement of the piston will result, such more rapid movement continuing until the lap, 72, again covers the port, 8, by the rearward movement of the reach rod, and the speed will be reduced to "creeping speed", and will finally become zero when the creeping ports, 58, 58ᵇ, are closed, in which position the lap, 72, will have fully covered the main port, 8. Further, the valve lever, 51, with its segmental member, 51ª, will have returned to its middle or normal position, and will register and engage with the trigger, 61, and thereby permit the pilot valve to close and prevent any possible leakage. To insure accuracy in the action of the trigger, a fixed bearing, 61ª, is formed on the base, 42, of the reverse lever segment, 48.

Rearward adjustment of the reversing mechanism is effected by moving the reverse lever, 40, toward the left, which causes the several movable members to operate in connection with the ports and conduits in a similar manner to that described for forward adjustment, except that the movements are in opposite directions. The motive fluid is, in each case, exhausted through a central exhaust port, 80, and an outlet, 81, or out through a valve lever slot, 82, which is formed in the valve seat, 53, and base, 9, and which can be caused to communicate with the port, 80, by cutting the passage, 80ª, and closing the outlet, 81.

By means of the valve mechanism above described, a greater or less amount of motive fluid may be admitted, in a given time, to the reversing cylinder, 3, for the purpose of imparting a more or less rapid movement to the piston, 2, as may be desired. For the slowest or "creeping" speeds, the creeping ports, 57, 57ᵇ, 58, 58ᵇ, are only opened, but when a higher speed is desired, the reverse lever, 40, is moved more rapidly, so as to cause the valve lever, 51, to be moved a greater angular distance from its vertical middle position, thereby opening one of the main ports, 8 or 8ª, a greater distance, and gradually admitting a greater amount of motive fluid to the reversing cylinder. The main ports, 8 and 8ª, are also fitted with "creeping" ports, by cutting their edges V shaped, so that their opening will be very gradual, and very small at the beginning. This construction, in connection with the small creeping ports, 57, 58, provides for a very gradual admission and exhaust of motive fluid to and from the reversing cylinder, and consequently gives the operator a correspondingly complete control of the adjustments of the gear.

Considerable difficulty has heretofore been experienced in practice, due to the effect of lost motion which seriously impaired the accuracy of adjustment and operation of the controlling valves of fluid pressure reversing cylinders. This difficulty was primarily caused by the location of a controlling valve and a floating lever directly upon, or adjacent to, the reversing cylinder, and their connection to an operator's lever in the cab by means of a long reach rod having a very small amount of longitudinal movement, the result being that a comparatively slight error in setting up the gear would substantially interfere with its usefully practical operation, this objectionable result being aggravated by distortions in the engine frame. These objections are obviated, under my invention, by mounting the quadrant and operating levers directly on the controlling valve casing, and in the cab, and extending the lower end of the floating lever a considerable distance downwardly, for the purpose of imparting a comparatively large longitudinal movement to the reach rod, as compared with the controlling valve and its lever, so that the effect of the ordinary amount of lost motion, or error in setting up the parts on a locomotive, will be inappreciable. By reference to Fig. 1, it will be seen that the downward extension of the lever, 49, enables the reach rod to be disposed horizontally and conveniently adjacent to the locomotive boiler and running board.

I claim as my invention and desire to secure by Letters Patent:

1. In a valve reversing gear, the combination of a reverse shaft, a reversing motor coupled thereto, means for controlling the supply and exhaust of motive fluid to and from said motor, a clutch coupled to the reverse shaft and to the motor, and means for automatically releasing the clutch by the action of the motor, prior to the actuation of the reverse shaft by said motor.

2. In a valve reversing gear, the combination of a reverse shaft, a reversing cylinder, a piston fitted to reciprocate therein and coupled to the reverse shaft, means for controlling the supply and exhaust of motive fluid to and from the reversing cylinder, a clutch coupled to the piston, and means, interposed between the piston and clutch, for automatically releasing the clutch by the action of the piston, prior to the actuation of the reverse shaft by said piston.

3. In a valve reversing gear, the combination of a reverse shaft, a reversing cylinder, a piston fitted to reciprocate therein and coupled to the reverse shaft, means for controlling the supply and exhaust of motive fluid to and from the reversing cylinder comprising a manually operable controlling valve working in a casing communicating with a source of fluid supply and having ports governed by said valve, conduits connecting said ports with opposite ends of the reversing cylinder, and automatically operable means coupling the piston to the controlling valve, a clutch coupled to the piston, and means, interposed between the piston and clutch, for automatically releasing the clutch by the action of the piston, prior to the actuation of the reverse shaft by said piston.

4. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the control valve to the valve gear member, a clutch fitting in the reversing cylinder and actuated by the piston thereof, and a rod secured to the clutch and coupled to the valve gear member.

5. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, a clutch coupled to the reverse shaft and to the piston, means for automatically releasing said clutch by the action of the piston, prior to the actuation of the valve gear member by said piston, and a spring bearing on said clutch and normally holding it in locked position.

6. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a clutch fitting in the reversing cylinder and actuated by the piston thereof, a rod secured to the clutch and coupled to the valve gear member, and a spring bearing on the clutch and normally holding it in locked position.

7. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a clutch fitting in the reversing cylinder and actuated by the piston thereof, a rod secured to the clutch and coupled to the valve gear member, spring seats fitted to slide on said rod, and a spring interposed between said seats and exerting pressure, through one of them, on the clutch, to normally hold it in locked position.

8. In a valve reversing gear, the combination of a reversing cylinder, a hollow or chambered piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a clutch fitting in the reversing cylinder and actuated by the piston thereof, a rod secured to the clutch and coupled to the valve gear member, and a spring inclosed within the piston and bearing on the clutch to normally hold it in locked position.

9. In a valve reversing gear, the combination of a reversing cylinder, a piston fitted to reciprocate therein, a valve gear member coupled to the piston, fluid pressure supply and exhaust conduits communicating with opposite ends of the reversing cylinder, manually operable means for controlling said conduits, an expansible clutch fitting in the reversing cylinder, members connected to said piston adapted to engage with and disengage from said clutch and thereby effect expansion and release thereof, respectively, and coöperating members connected to said clutch.

10. In a valve reversing gear, the combination of a reversing cylinder, a piston fitted to reciprocate therein, a valve gear member coupled to the piston, fluid pressure supply and exhaust conduits communicating with opposite ends of the reversing cylinder, manually operable means for controlling said conduits, an expansible clutch fitting in the reversing cylinder, members connected to said piston adapted to engage with and disengage from said clutch and thereby effect expansion and release thereof, respectively, coöperating members connected to said clutch, and means for adjusting the relation of said piston and clutch members.

11. In a valve reversing gear, the combination of a reversing cylinder, a piston fitted to reciprocate therein, a valve gear member coupled to the piston, fluid pressure supply and exhaust conduits communicating with opposite ends of the reversing cylinder, manually operable means for controlling said conduits, an expansible clutch comprising friction members fitting in the reversing cylinder, roller supports fixed to the piston, rollers rotatable in said supports, and bearings connected to the piston members and having oppositely inclined faces adapted to abut against said rollers.

12. In a valve reversing gear, the combination of a reversing cylinder, a piston fitted to reciprocate therein, a valve gear member coupled to the piston, fluid pressure supply and exhaust conduits communicating with opposite ends of the cylinder, manually operable means for controlling said conduits, an expansible clutch comprising friction members fitting in the reversing cylinder, roller supports fixed to the piston, rollers rotatable in said supports, and adjustable wedges bearing against said rollers.

13. In a valve reversing gear, the combination of a reversing cylinder, a piston fitted to reciprocate therein, a valve gear member coupled to the piston, fluid pressure supply and exhaust conduits communicating with opposite ends of the reversing cylinder, manually operable means for controlling said conduits, an expansible clutch fitting in the reversing cylinder and engaged with the piston, and means, adjustable from the exterior of the cylinder, for applying frictional resistance to the piston.

14. In a valve reversing gear, the combination of a reversing cylinder, a stuffing box thereon, a piston fitted to reciprocate therein, a valve gear member, a rod fixed to the piston and coupled to said valve gear member, fluid pressure supply and exhaust conduits communicating with opposite ends of the reversing cylinder, manually operable means for controlling said conduits, an expansible clutch fitting in the reversing cylinder and engaged with the piston, and a tubular extension or trunk fixed to the piston and extending outwardly through the stuffing box.

15. In a valve reversing gear, the combination of a reversing cylinder, an expansible clutch fitting therein, a valve gear member, a rod fixed to said clutch and coupled to the valve member, a piston engaging said clutch and fitted on said rod with the capacity of longitudinal movement thereon toward and from the clutch, fluid pressure supply and exhaust conduits communicating with opposite ends of the reversing cylinder, and manually operable means for controlling said conduits.

16. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a pilot valve governing creeping supply ports leading into the conduits, and means for actuating said pilot valve.

17. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a pilot valve governing creeping supply ports leading into the conduits, a segment latch, and a latch lever coupled to said latch and to the pilot valve.

18. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable valve controlling main ports open to said conduits, automatically operable means coupling the controlling valve to the valve gear member, a pilot valve, creeping ports governed by said pilot valve, and a plurality of conduits, each connecting a creeping port with one of the main ports.

19. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a pilot valve governing creeping supply ports leading into the conduits, manually operable means for opening said pilot valve, and automatically operable means for closing said pilot valve.

20. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a casing inclosing said valve and supported independently of the reversing motor, a fixed latch segment, a manually operable latch lever provided with a latch adapted to engage said segment, a pivotal support for said lever, fixed to the valve casing, a floating lever coupled at one end to said latch lever, a reach rod coupling the opposite end of the floating lever to the valve gear member, and a valve lever pivotally supported on the valve casing and coupled to the controlling valve and to the floating lever.

21. In a valve reversing gear, the combination of a reversing cylinder, a piston fitted to reciprocate therein, a valve gear member coupled to the piston, fluid pressure supply and exhaust conduits communicating with opposite ends of the reversing cylinder, a manually operable controlling valve governing said conduits, automatically operable means coupling the controlling valve to the valve gear member, a pilot valve governing supply ports leading into the conduits, means for manually opening said pilot valve, a lever adapted to actuate the controlling valve, a notched member thereon, and a trigger connected to said pilot valve and adapted to effect its closure by engagement with said notched member in the closed position of the controlling valve.

22. In a valve reversing gear, the combination of a reversing motor, a reverse shaft coupled thereto, means for controlling the supply and exhaust of motive fluid to and from the reversing motor, comprising a manually operable controlling valve working in a casing communicating with a source of fluid supply and having ports governed by said valve, conduits connecting said ports with the reversing motor, and automatically operable means coupling the controlling valve with the motor, an expansible friction clutch coupled to the reverse shaft, and means for actuating said clutch by adjustments of the reversing gear.

23. In a valve reversing gear, the combination of a reversing motor, a reverse shaft coupled thereto, means for controlling the supply and exhaust of motive fluid to and from the reversing motor, comprising a manually adjustable controlling valve working in a casing communicating with a source of fluid supply and having ports governed by said valve, conduits connecting said ports with the reversing motor, and automatically operable means coupling the controlling valve with the motor, a reciprocating friction clutch comprising expansible members working in a cylindrical casing, and means for actuating the expansion members of said clutch.

WILLIAM DALTON.

Witnesses:
E. I. SCHAUBER,
WILL. W. HAMBLY.